(12) United States Patent
Filali-Adib et al.

(10) Patent No.: US 8,230,122 B2
(45) Date of Patent: Jul. 24, 2012

(54) DIRECT PROVISIONING OF STORAGE DEVICES TO VIRTUAL OS PARTITIONS

(75) Inventors: Khalid Filali-Adib, Austin, TX (US); Kevin L. Fought, Round Rock, TX (US); Chris A. Schwendiman, Round Rock, TX (US); David W. Sheffield, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 12/834,518

(22) Filed: Jul. 12, 2010

(65) Prior Publication Data
US 2012/0011284 A1   Jan. 12, 2012

(51) Int. Cl.
*G06F 3/00* (2006.01)
*H04L 29/06* (2006.01)

(52) U.S. Cl. .......................................... 710/8; 713/155
(58) Field of Classification Search ....... 710/8; 713/155
See application file for complete search history.

(56) References Cited

U.S. PATENT DOCUMENTS

| | | | |
|---|---|---|---|
| 6,883,163 B1 * | 4/2005 | Schwabe ...................... | 717/126 |
| 7,200,704 B2 | 4/2007 | Njoku et al. | |
| 2004/0236852 A1 | 11/2004 | Birkestrand et al. | |
| 2008/0295111 A1 * | 11/2008 | Craft et al. ..................... | 719/313 |
| 2008/0320269 A1 * | 12/2008 | Houlihan et al. ............. | 711/203 |
| 2010/0161964 A1 * | 6/2010 | Dodgson et al. .............. | 713/155 |

OTHER PUBLICATIONS

Alford, Jack, "AIX 6.1 Workload Partitions", *IBM Techdocs* http://www.ibm.com/developerworks/aix/library/au-workload/?S_TACT=105AGY82& (Date obtained from internet: Jul. 1, 2010) Nov. 20, 2007, 10 pages.

Dimmer, Ingo et al., "IBM i Virtual I/O Performance in an IBM System Storage SAN Volume Controller with IBM System Storage DS8000 Environment", *IBM Techdocs*, Version 1.0 http://www.ibm.com/support/techdocs/atsmastr.nsf/Webindex/WP101435 Feb. 16, 2009, 13 pages.

* cited by examiner

*Primary Examiner* — Hyun Nam
(74) *Attorney, Agent, or Firm* — DeLizio Gilliam, PLLC

(57) ABSTRACT

An OS instance can maintain management responsibility for SAN adapters to ensure separation and isolation of WPARs, while WPARs are given the capability of configuring an adapter (e.g., adding endpoint storage devices to the adapter). An operating system instance allocates an adapter to a first of a plurality of virtual operating system instances. The first virtual operating system instance updates a device data structure with an entry that indicates the adapter. The first virtual operating system instance maintains the device data structure. The first virtual operating system instance modifies the entry in the device data structure to associate a set of one or more endpoint storage devices with the adapter. The set of endpoint storage devices are provisioned to the first virtual operating system instance from a storage area network. The first virtual operating system instance configures the set of endpoint storage devices.

19 Claims, 4 Drawing Sheets

DIRECT PROVISIONING OF STORAGE DEVICES TO VIRTUAL OS PARTITIONS

BACKGROUND

Embodiments of the inventive subject matter generally relate to the field of operating system virtualization, and, more particularly, to providing endpoint storage device configuration capability to a virtual operating system instance.

Operating system virtualization allows a single physical machine to seemingly run as several machines, which can be referred to as virtual operating system instances. The virtual operating system instances are separate, or isolated, from each other in some ways. The virtual operating system instances have separate file systems, separate namespaces, and separate process environments. In other ways, however, the virtual operating system instances are not separate. The virtual operating system instances share the physical memory, kernel services, libraries, and firmware of the host machine. Although the virtual operating system instances may share physical memory, the isolation is maintained by maintaining mutually exclusive memory spaces. Thus, each instance of the operating system can operate as if a separate server or machine from the point of view of its users/applications.

SUMMARY

Provisioning storage from a storage area network to a virtual operating system instance comprises an operating system instance allocating an adapter to a first of a plurality of virtual operating system instances. The first virtual operating system instance updates a device data structure with an entry that indicates the adapter. The first virtual operating system instance maintains the device data structure. The first virtual operating system instance modifies the entry in the device data structure to associate a set of one or more endpoint storage devices with the adapter. The set of endpoint storage devices are provisioned to the first virtual operating system instance from a storage area network. The first virtual operating system instance configures the set of endpoint storage devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
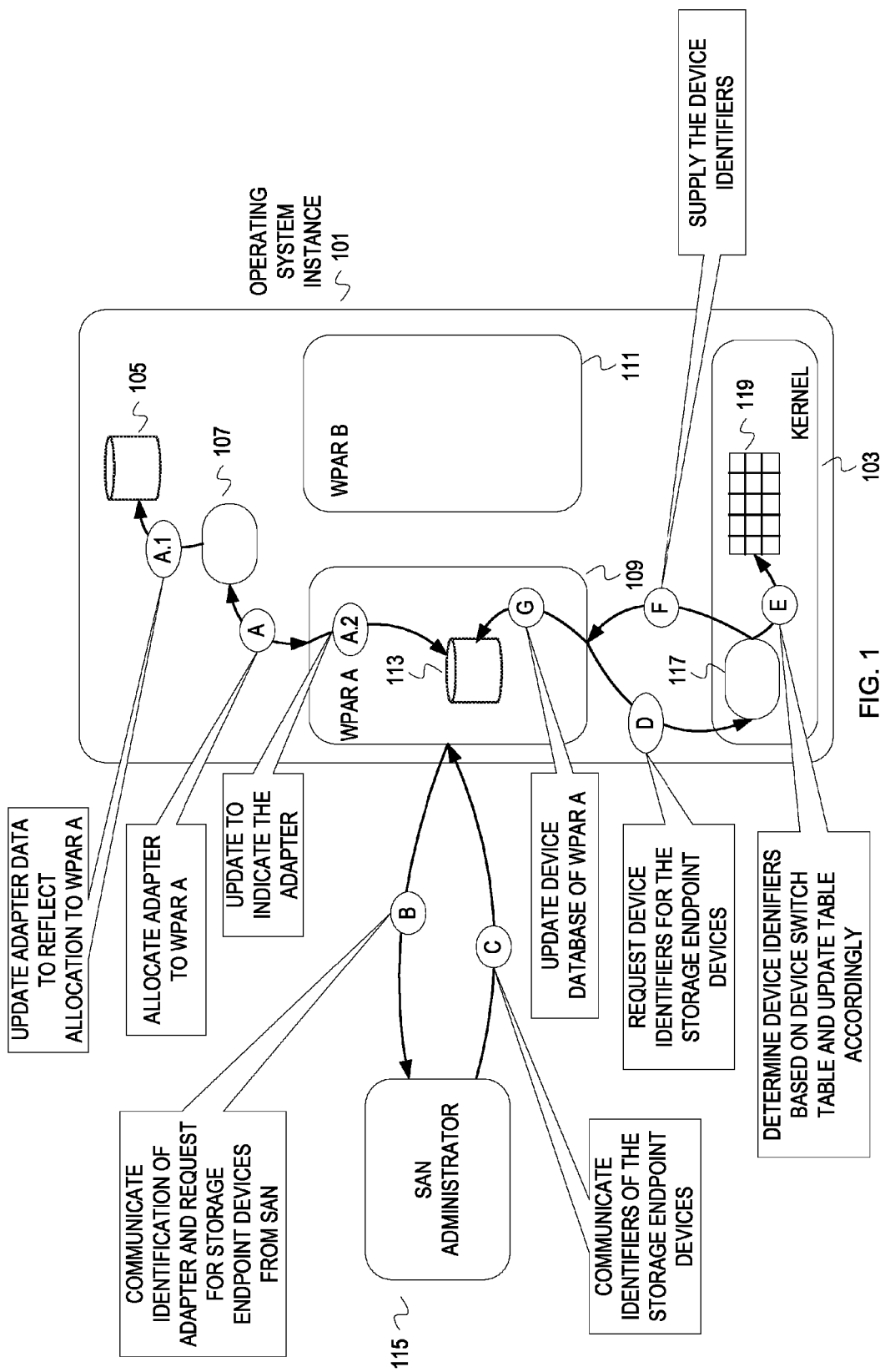
FIG. 1 depicts a conceptual diagram of a workload partition configuring a SAN adapter to add an endpoint storage device provisioned from a SAN adapter.

The description that follows includes exemplary systems, methods, techniques, instruction sequences and computer program products that embody techniques of the present inventive subject matter. However, it is understood that the described embodiments may be practiced without these specific details. For instance, although examples refer to storage area networks, embodiments can be applied to other device networking environments and protocols. In other instances, well-known instruction instances, protocols, structures and techniques have not been shown in detail in order not to obfuscate the description.

Organizations employ operating system virtualization or workload partitions (WPARs) to organize and isolate workloads in accordance with business requirements, organizational guidelines, etc., while efficiently utilizing available equipment. For instance, an administrator can create different WPARs for a marketing department database and associated applications ("marketing database workload"), an accounting department database and associated applications ("accounting database workload"), and legal department electronic mail server ("legal e-mail workload"). Instead of using 3 different servers, the resources of a single server can be used to satisfy the needs of the 3 workloads. Various restrictions on resource management and resource access are imposed on the WPARs to ensure separation and isolation among the WPARs.

In order to maintain the separation and isolation among the WPARs, configuration functionality was restricted. In the context of storage area network (SAN) devices, a WPAR was limited to accessing a file that represented an endpoint storage device of a SAN. An administrator of the operating system instance that managed the WPAR would request an endpoint storage device for a physical adapter (e.g., Fiber Channel adapter) or a virtual adapter (e.g., N_Port ID Virtualization). After a SAN administrator provisions the endpoint storage device (e.g., a magnetic storage device, tape storage device, optical storage device, a logical storage device) to the adapter, then the OS instance would update a device listing to associate the endpoint storage device with the adapter. The OS instance would then supply the WPAR a file that represented the endpoint storage device. The WPAR could then configure the endpoint storage device (e.g., create a volume, create folders, etc.) via the file. The WPAR, however, was limited to the provisioned endpoint storage device. The WPAR could not obtain additional endpoint storage devices without the overhead of the interaction between the OS instance and the SAN.

The configuration restrictions reduce the capabilities of the WPARs. Providing a WPAR with the capability to configure an adapter and endpoint storage devices increases the utility of WPARs and reduces communication overhead. An OS instance can maintain management responsibility for SAN adapters to ensure separation and isolation of WPARs, while WPARs are given the capability of configuring an adapter (e.g., adding endpoint storage devices to the adapter). To avoid device identifier collisions or conflicts while still allowing the WPARs to share operating system resources (e.g., kernel extensions, device drivers, libraries and kernel services), the functionality for generating device numbers can be moved down into the kernel from the OS instance user space.

FIG. 1 depicts a conceptual diagram of a workload partition configuring a SAN adapter to add an endpoint storage device provisioned from a SAN adapter. In FIG. 1, an operating system instance 101 manages two working partitions: a WPAR A 109 and a WPAR B 111. The OS instance 101 may be running in accordance with various configurations. For example, the OS instance 101 may have been directly installed onto a machine, or installed on a logical partition created on a machine. The OS instance 101 maintains a device database 105. The OS instance 101 comprises a kernel 103. The kernel 103 maintains a device switch table 119 that indicates device identifiers (e.g., device major numbers and device minor numbers) that have been allocated by the kernel 119.

At a stage A, the OS instance 101 allocates a SAN adapter to the WPAR A 109. Allocating the SAN adapter involves a resource management process 107 of the OS instance 101 updating the device database 105 to reflect allocation of the SAN adapter to the WPAR A 109. At stage A.1, FIG. 1 depicts the resource management process 107 updating adapter data in the device database 105 to reflect allocating the adapter. For example, the resource management process 107 updates an entry in the database for the allocated adapter to indicate ownership by the WPAR 109, thus preventing the SAN adapter from being allocated to any other WPAR of the OS system instance. In this case, the resource manager process 107 will not allocate the SAN adapter to the WPAR B 111. At stage A.2, the WPAR A 109 updates its own device database 113 to indicate the adapter (e.g., a network address or port number of the adapter).

At stage B, the WPAR A 109 communicates the identification of the SAN adapter to a SAN administrator 115 or SAN administration process to request one or more storage endpoint devices from the SAN. An administrator of the WPAR A 109 can send a communication to the SAN administrator 115 that indicates the port number for the adapter allocated to the WPAR A 109, and an amount of storage and/or number of endpoint storage devices desired. The SAN administrator 115 then provisions the endpoint storage devices to the adapter of the WPAR A 109.

At stage C, the SAN administrator communicates identifiers of the storage endpoint devices to the WPAR A 109. For example, the SAN administrator communicates logical unit numbers to the WPAR A 109.

At stage D, the WPAR A 109 requests device identifiers for the provisioned endpoint storage devices. A request is communicated from the WPAR A 109 to a device resource manager process 117 of the kernel 103.

At stage E, the device resource management process 117 determines device identifiers based on a device switch table 119 maintained by the kernel 103. The device switch table 119 indicates device identifiers already allocated by the device resource manager 117. With the device switch table 119, the device resource manager 117 ensures uniqueness of device identifiers within the OS instance 101 even though the OS instance lacks visibility of at least some of the devices managed by the WPARs. The device resource manager process 117 determines available device identifiers, and allocates the available device identifiers for the endpoint storage devices provisioned to the WPAR A 109. The device resource manager process 117 updates the device switch table 119 accordingly.

At stage F, the device resource manager process 117 supplies the device identifiers to the WPAR 109.

At stage G, the WPAR A 109 updates the device database 113 to indicate the device identifiers for the provisioned endpoint storage devices. The WPAR A 109 manages the endpoint storage devices with the device identifiers allocated by the device resource manager process 117 of the kernel 103.

An administrator of the WPAR A 109 can also add and remove endpoint storage device provisioned to the adapter ("child devices") without the overhead of interacting with the OS instance. In addition, the expanded management functionality includes the capability of the WPAR A to manage multi-pathing to the endpoint storage devices across multiple adapters. The WPAR A109 can manage load balancing, failover, etc. across the adapters without involvement of the OS instance beyond the initial adapter allocation.

All of the stages depicted in FIG. 1 do not necessarily occur in sequence. There may be additional intermediate operations and/or input that leads to a particular stage. In addition, some of the stages may occur in sequence, but separated by gaps of time. For example, an administrator of a WPAR may not request endpoint storage devices immediately after being allocated a SAN adapter.

Figure 2:
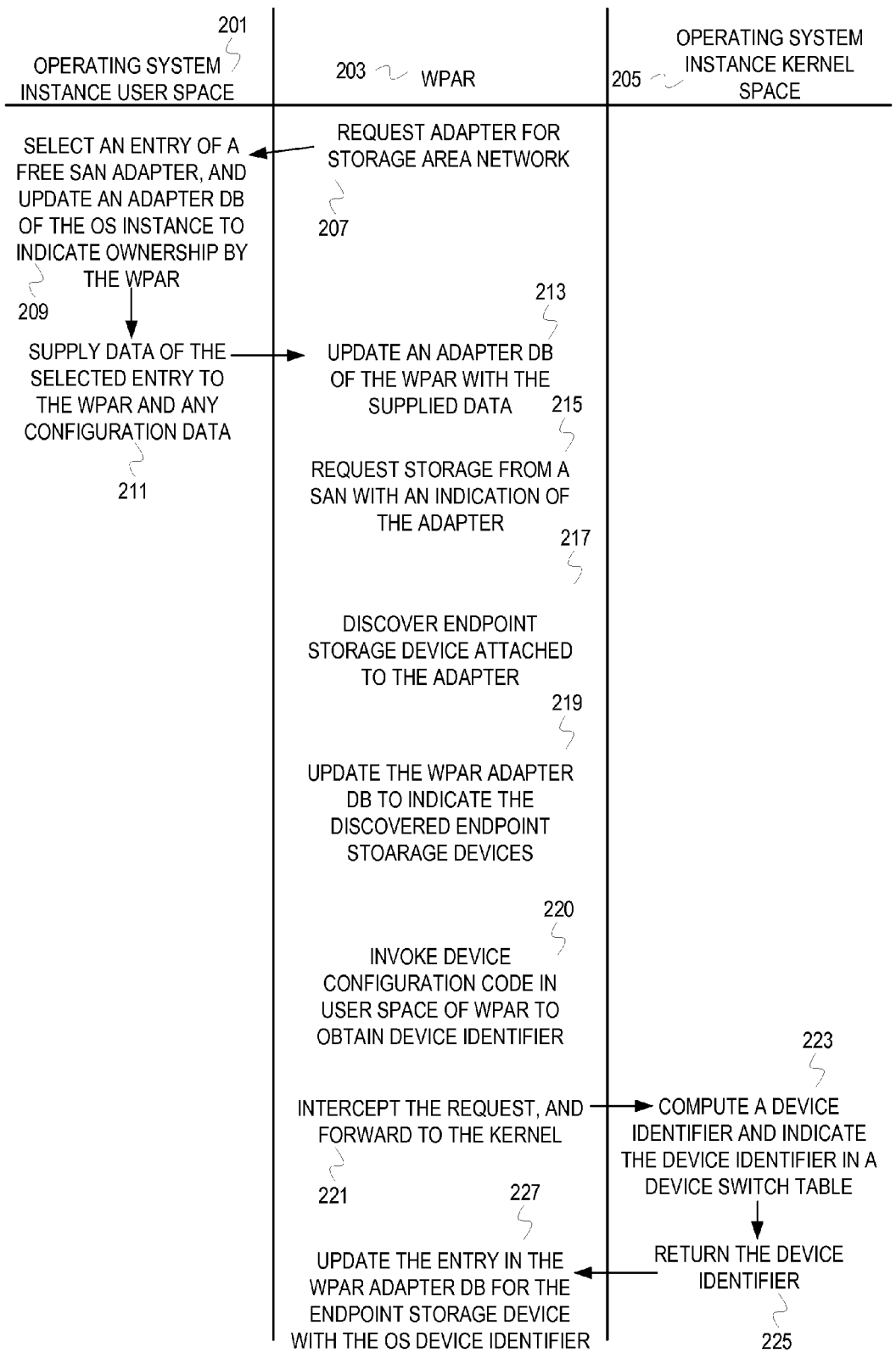
FIG. 2 depicts a waterfall diagram of example operations for resource management for direct provisioning of endpoint storage devices to a workload partition.

Although FIG. 1 depicted some details for direct provisioning of endpoint storage devices, some operations were not depicted. FIG. 2 elaborates on some additional operations that can be performed in some embodiments.

FIG. 2 depicts a waterfall diagram of example operations for resource management for direct provisioning of endpoint storage devices to a workload partition. FIG. 2 depicts the example operations being performed in an operating system instance user space 201, a workload partition 203, and a kernel space 205 of the operating system instance 201. Code executed (i.e., method or functions invoked, applications, etc.) in the OS instance user space 201 is executed or runs in execution space that comprises virtual and/or physical memory that is designated for the OS instance. Code executed in the user space of the WPAR 203 executes within the execution space designated for the WPAR 203. Similarly, the kernel space 205 comprises execution space (i.e., virtual and/or physical memory) designated for kernel code.

The WPAR 203 submits a request for a storage area network adapter from the operating system instance user space 201 (207). For example, an administrator of the WPAR 203 enters a command to configure an adapter or run a script for configuring an adapter that has not been allocated to the WPAR yet. Responsive to the command or execution of the script, a request message is generated that identifies the WPAR 203 and indicates the request for a SAN adapter. As another example, an administrator of the WPAR 203 may call an administrator of the operating system instance, send an electronic mail message, or personally speak to the administrator to acquire the adapter for the WPAR 203.

A process or thread in the operating system instance user space 201 selects an entry in an adapter database maintained in the user space 201 (209). The process selects an entry of an adapter that has not been allocated to another WPAR and that is not in use by the operating system instance. An administrator of the operating system instance can choose to unconfigure or release a SAN adapter, and then allocate the unconfigured or released adapter to the requesting WPAR. Releasing an adapter can involve the operating system instance user space 201 moving applications or processes to a different adapter at a point in time that does not disrupt operation of the applications or processes. Releasing the adapter may involve determining adapters that have not been used by any application or process. Releasing or unconfiguring the adapter also involves updating the adapter database to indicate that the adapter can be allocated. Once an entry is selected, the process in the operating system instance user space 201 updates the adapter database to indicate that the adapter is allocated to the WPAR 203. The data of the selected entry (e.g., port identifier and device identifier) and any adapter configuration data is supplied to the WPAR 203 (211). Embodiments can pass the adapter data as a parameter in a method invocation or function call. Embodiments can generate a message with the adapter data, and send the message to the WPAR via a communication channel between the operating system instance and the WPAR.

The WPAR 203 updates an adapter database maintained in the WPAR 203 with the supplied data (213). For instance, the data is copied from the OS instance database to the WPAR database. Embodiments are not limited to requesting and allocating a single adapter at a time to a WPAR. Embodiments can request multiple adapters, and allocate multiple adapters to a WPAR.

The WPAR 203 requests storage (e.g., tape storage, SCSI storage, optical storage, etc.) from a SAN with an indication of the allocated adapter (215). For example, an administrator of the WPAR contacts a SAN administrator to request storage. The WPAR administrator identifies the adapter to which the storage should be provisioned. Embodiments can execute a file, run a script, or invoke a method to submit the request for storage to the SAN. In addition, the WPAR can request provisioning of storage to several adapters allocated to the WPAR. A SAN administrator provisions the storage to the adapter.

After the storage is provisioned to the adapter, the WPAR 203 can discover the one or more endpoint storage devices attached to the adapter (217). For example, a command may be entered to configure the adapter, which invokes a configure adapter method. Invocation of the configure adapter method causes the WPAR 203 to discover the endpoint storage devices attached to the adapter. T The adapter database in the WPAR 203 is updated to associate the provisioned endpoints storage devices with the adapter (219). For example, LUNs supplied from the SAN are added to an entry or linked to a node in a tree for the corresponding adapter.

If the adapter configuration method discovers an endpoint storage device that is not configured, then device configuration code is invoked in the user space of the WPAR 203 to obtain a device identifier for the attached endpoint storage device (220). To access a device, the device must be uniquely identifiable within an operating system. A device driver or kernel extension that handles operations (e.g., read/write operations) for a type of device (e.g., optical storage device) may be responsible for several devices. The device driver or kernel extension utilizes device identifiers (e.g., major and minor numbers) to distinguish the devices. Since the WPARs of a system share the kernel extensions and device drivers, then the devices are identified with device identifiers that are unique from the perspective of the kernel extension or device driver, hence unique across the WPARs.

Since the WPAR 203 should operate as an operating system instance and in order to avoid modifying device drivers and kernel extensions to accommodate the added capability of WPARs, the code to obtain a device identifier should be accessible to the configuration code (e.g., a configure adapter method or configure disk method) without customization or modification of the configuration code. If each WPAR maintained a separate data structure of device identifiers, the shared device drivers or kernel extensions would not operate properly. In this environment of multiple possible WPARs, the request for a device identifier is intercepted and the device identifier is allocated in the operating system instance kernel space 205 (221). Embodiments can indicate the WPAR in the request when initially generated, or modify the intercepted request to indicate the WPAR.

The responsibility of ensuring uniqueness of device identifiers is moved to the kernel space from the user space to ensure isolation of the WPARs while allowing the WPARs to configure/manage devices that are not visible to the operating system instance user space. Although the WPARs manage and configure some of their own devices, the WPARs still share the kernel. The operating system instance kernel space 205 computes a device identifier and indicates the device identifier in a device switch table (223). The kernel space 205 tracks allocated device identifiers with the device switch table to ensure uniqueness of the device identifiers. The kernel space 205 then returns the device identifier to the WPAR (225).

After receiving the device identifier, the WPAR updates an entry in the WPAR adapter database with the device identifier (227). The WPAR selects the entry for the provisioned endpoint storage device and records the device identifier into the entry. Thus, the provisioned endpoint storage device is not identified by the device identifier. The submitted command (220) is now carried out with the device identifier.

Figure 3:
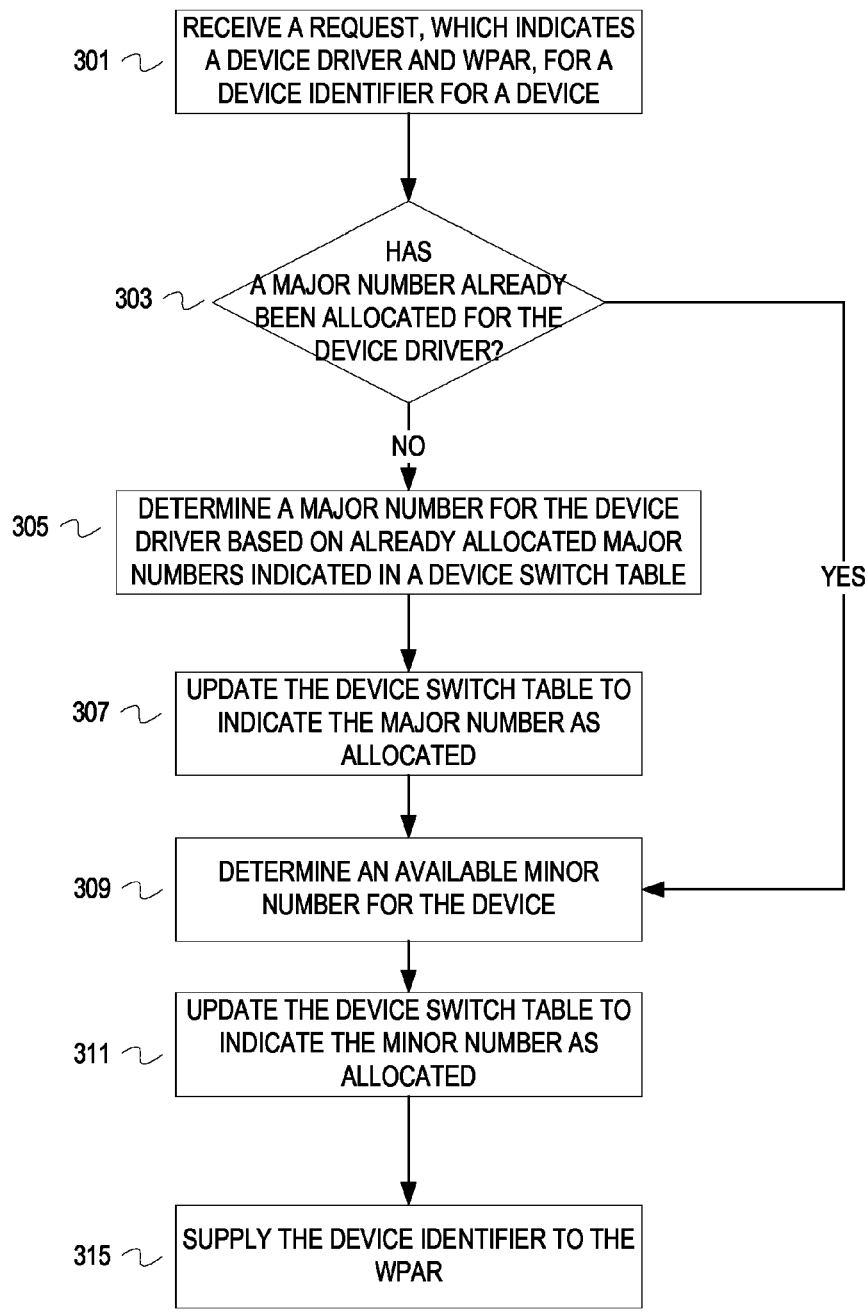
FIG. 3 depicts a flowchart of example operations for managing device identifiers in a system with operating system virtualization.

Although the allocation of device identifiers has been described only in the context of a SAN endpoint storage device, embodiments are not so limited. WPARs can be implemented to manage a variety of resources that are accessed with kernel extensions or device drivers shared across WPARs. FIG. 3 provides example operations that are not limited to SAN devices.

FIG. 3 depicts a flowchart of example operations for managing device identifiers in a system with operating system virtualization. The operations are performed by a process or daemon ("kernel process") within the kernel space of an operating system instance. The kernel process receives a request for a device identifier (301). For example, a configuration method or function includes a call to a library function after linking. Execution of the configuration method (e.g., configure disk) invokes the library function, which is responsible for providing device identifiers. To avoid modifying the configuration method, the library function presents as if it handles the device identifier allocation within the user space as before. For instance, the parameters passed to the library function are the same. Although the library function appears the same, the library function hooks into the kernel. Execution of the library function invokes the kernel code that now handles allocation of device identifiers. The request indicates a device driver (or kernel extension) for the device. The request can also indicate a WPAR in order to return the device identifier to the proper WPAR. The device identifier may also be returned based on a pointer or reference that identifies the invokee (e.g., a memory location for the result).

The kernel process determines if a major number has already been allocated for the device driver indicated in the request (303). For example, the kernel process determines that a major number has not been allocated for the device driver because the request identifies the device driver or type of device instead of a major number. As another example, the kernel process accesses a data structure to determine whether the data structure indicates a major number for a device type or device driver indicated in the request.

If the major number has not been allocated for the device driver, then a major number is determined for the device driver based on already allocated major numbers indicated in a device switch table (305). Embodiment can use a next available number based on the already allocated major numbers, compute a major number with a function that factors in the device type, etc.

The kernel process updates the device switch table to indicate allocation of the major number (307). For example, the kernel process records the major number in the device switch table. As another example, the kernel process sets a flag to indicate that at major number has been allocated.

After the major number is allocated or after determining that the major number was already allocated (303), a minor number is determined for the device (309). For example, the kernel process reads the device switch table to determine all minor numbers already allocated for the major number. As another example, the kernel process calls a function that continually generates new minor numbers based on the major number and previously allocated minor number. The example function can start generating numbers from a default value when the system reboots.

The device switch table in the kernel space is updated to indicate the minor number as allocated for the major number (311). Embodiments can record the minor number in a data structure or set a flag of the minor number in the data structure.

The device identifier is then supplied to the WPAR identified in the received request (315). For instance, the major number and minor number (or the minor number alone) is returned to the WPAR by returning the device identifier to the memory location designated by the callee function or method.

Operations depicted in the flowchart and the waterfall diagram are intended to aid in understanding the inventive subject matter and should not be used to limit embodiments of the invention. Embodiments may perform additional operations, different operations, the operations in a different order, the operations in parallel, etc. For instance, FIG. 3 may not perform the operation depicted by block 303. An embodiment can indicate a major number in the request to communicate that the major number has already been allocated, and that only a minor number is being requested.

The use of particular databases or data structures in describing examples should not be used to limit embodiments of the invention. For instance, embodiments are not limited to maintaining device databases or device switch tables as depicted in FIG. 1. Embodiments can maintain the data identifying devices managed by an OS instance in different types of databases, different types of data structures (e.g., a hash table, a tree, etc.), and organize the data by different criteria (e.g., different databases for different classes of devices). Similarly, embodiments do not necessarily maintain a "table" for allocated device identifiers. The device switch table can be a linked list, a tree, a hardware table, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
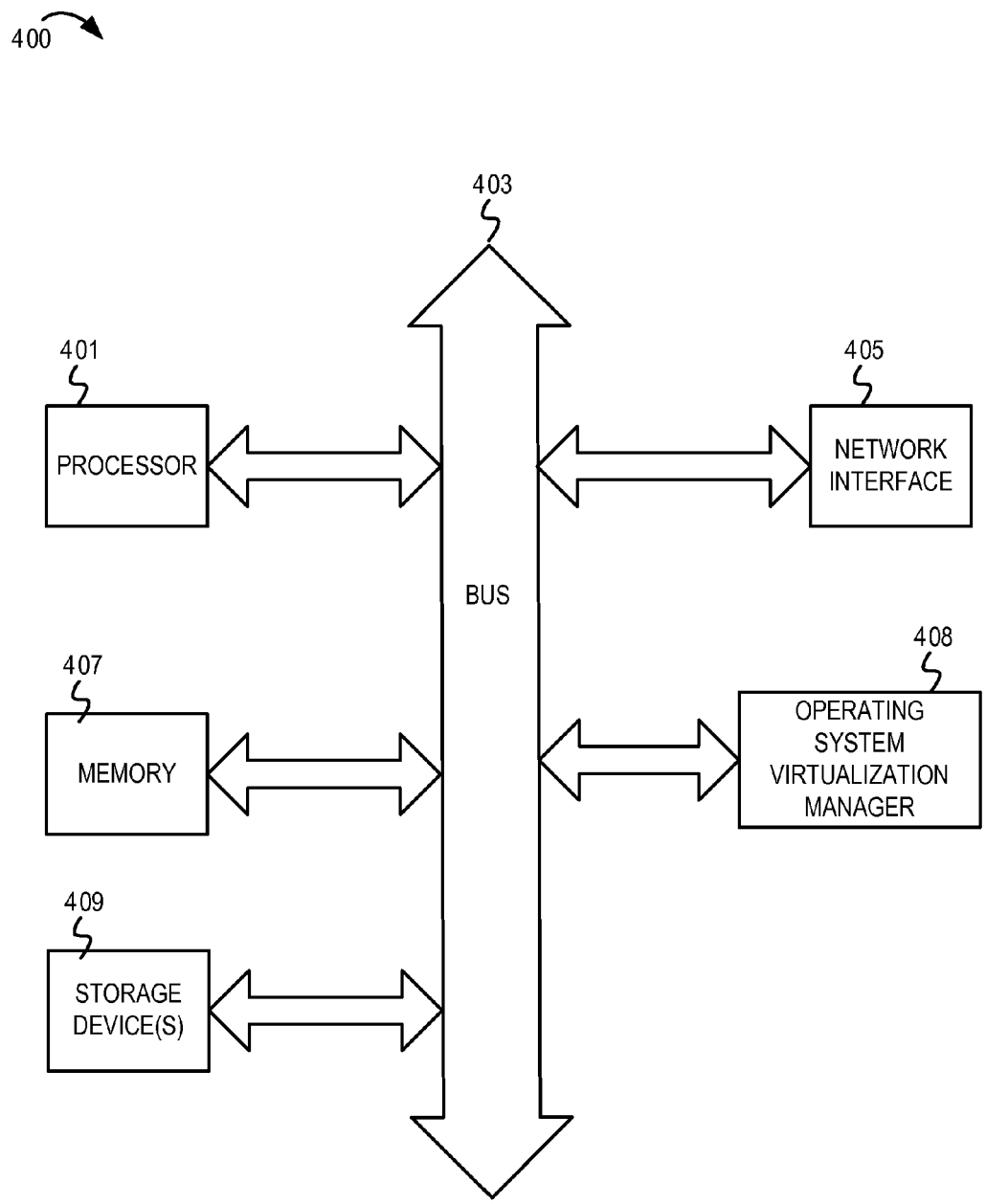
FIG. 4 depicts an example computer system.

FIG. 4 depicts an example computer system. A computer system 400 includes a processor 401 (possibly including multiple processors, multiple cores, multiple nodes, and/or implementing multi-threading, etc.). The computer system 400 includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system 400 also comprises an operation system virtualization manager 408. The operating system virtualization manager 408 embodies functionality that allows for SAN endpoint storage devices to be directly provisioned to virtual operating system instances within an operating system instance. The operating system virtualization manager 408 also manages device identifier generation without compromising the attributes of operating system virtualization. The operating system virtualization manager 408 intercepts device identifier requests and reroutes those requests to the kernel space. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for adding the capability to manage endpoint storage devices from within a workload partition with less involvement of the operating system instance and management of device identifiers within kernel space as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
an operating system instance allocating an adapter to a first of a plurality of virtual operating system instances, wherein the plurality of virtual operating system instances run within the operating system instance,
wherein the operating system instance allocating the adapter to a first virtual operating system instance comprises:
the operating system instance determining that the adapter is available among a plurality of adapters allocated to the operating system instance;
the operating system instance updating an entry of a second device data structure maintained by the operating system instance to indicate that the adapter is allocated to the first virtual operating system instance, wherein the entry of the second device data structure corresponds to the adapter; and
supplying data from the entry of the second device data structure that corresponds to the adapter to the first virtual operating system instance;
the first virtual operating system instance updating a device data structure with an entry that indicates the adapter, wherein the first virtual operating system instance maintains the device data structure;
the first virtual operating system instance modifying the entry in the device data structure to associate a set of one or more endpoint storage devices with the adapter, wherein the set of endpoint storage devices are provisioned to the first virtual operating system instance; and
the first virtual operating system instance configuring the set of endpoint storage devices.

2. The method of claim 1, wherein said supplying the data from the entry of the second device data structure that corresponds to the adapter to the first virtual operating system instance comprises one of passing the data as a parameter in a method invocation and sending a message that comprises the data.

3. The method of claim 1 further comprising the first virtual operating system instance maintaining the device data structure separately from the operating system instance maintaining the second device data structure, wherein user space of the operating system instance lacks visibility of the device data structure and user space of the first virtual operating system instance lacks visibility of the second device data structure.

4. The method of claim 1, wherein the first virtual operating system instance configuring the set of endpoint storage devices comprises the first virtual operating system instance writing configuration data to the entry.

5. The method of claim 1 further comprising the first virtual operating system instance submitting an adapter request to the operating system instance.

6. The method of claim 1 further comprising the first virtual operating system instance requesting provisioning of the set of endpoint storage devices from a storage area network.

7. The method of claim 6, wherein said requesting provisioning of the set of endpoint storage devices from the storage area network comprises communicating a port number of the adapter and an identifier of the adapter.

8. The method of claim 1, wherein the adapter comprises one of a Fibre Channel adapter and a virtual adapter.

9. The method of claim 1, wherein the set of one or more endpoint storage devices comprise at least one of tape storage, magnetic storage, and optical storage.

10. A non-transitory computer readable storage medium having computer readable program code for configuring storage area network adapters and endpoint storage devices from within a virtual operating system instance, the computer readable program code comprising computer readable program code configured to:

allocate an adapter from an operating system instance to a first of a plurality of virtual operating system instances, wherein the computer readable program code configured to allocate the adapter from the operating system instance to the first of the plurality of virtual operating system instances comprises the computer readable program code configured to:
  access a second device data structure in an execution space of the operating system instance and determine that the adapter is available among a plurality of adapters allocated to the operating system instance;
  update an entry of the second device data structure maintained by the operating system instance to indicate that the adapter is allocated to the first virtual operating system instance, wherein the entry of the second device data structure corresponds to the adapter; and
  supply data from the entry of the second device data structure that corresponds to the adapter to the execution space of the first virtual operating system instance;
update a device data structure, in an execution space of the first virtual operating system instance, with an entry that indicates the adapter;
modify the entry in the device data structure to associate a set of one or more endpoint storage devices with the adapter after the set of endpoint storage devices are provisioned to the first virtual operating system instance from a storage area network; and
configure the adapter and the set of endpoint storage devices within the execution space of the first virtual operating system instance.

11. The non-transitory computer readable storage medium of claim 10, wherein the computer readable program code configured to supply the data from the entry of the second device data structure that corresponds to the adapter to the execution space of the first virtual operating system instance comprises the computer readable program code configured to pass the data as a parameter in a method invocation.

12. The non-transitory computer readable storage medium of claim 10, wherein the computer readable program code configured to configure the adapter and the set of endpoint storage devices within the execution space of the first virtual operating system instance comprises the computer readable program code configured to write configuration data to the entry of the device data structure in the execution space of the first virtual operating system instance.

13. An apparatus comprising:
  a processor operable to execute computer readable program code;
  a network interface; and
  a computer readable storage medium having computer readable program code embodied therewith, the computer readable program code comprising computer readable program code configured to:
    allocate an adapter from an operating system instance to a first of a plurality of virtual operating system instances, wherein the computer readable program code configured to allocate the adapter from the operating system instance to the first of the plurality of virtual operating system instances comprises the computer readable program code configured to,
      access a second device data structure in an execution space of the operating system instance and determine that the adapter is available among a plurality of adapters allocated to the operating system instance;
      update an entry of the second device data structure maintained by the operating system instance to indicate that the adapter is allocated to the first virtual operating system instance, wherein the entry of the second device data structure corresponds to the adapter; and
      supply data from the entry of the second device data structure that corresponds to the adapter to the execution space of the first virtual operating system instance;
    update a device data structure, in an execution space of the first virtual operating system instance, with an entry that indicates the adapter;
    modify the entry in the device data structure to associate a set of one or more endpoint storage devices with the adapter after the set of endpoint storage devices are provisioned to the first virtual operating system instance from a storage area network; and
    configure the adapter and the set of endpoint storage devices within the execution space of the first virtual operating system instance.

14. The apparatus of claim 13 wherein the computer readable program code configured to configure the adapter and the set of endpoint storage devices within the execution space of the first virtual operating system instance comprises the computer readable program code configured to write configuration data to the entry of the device data structure in the execution space of the first virtual operating system instance.

15. The non-transitory computer readable storage medium of claim 10, wherein the computer readable program code is further configured to maintain the device data structure separately from the operating system instance maintaining the second device data structure, wherein user space of the operating system instance lacks visibility of the device data structure and user space of the first virtual operating system instance lacks visibility of the second device data structure.

16. The non-transitory computer readable storage medium of claim 10, wherein the computer readable program code configured to request provisioning of the set of endpoint storage devices from a storage area network.

17. The non-transitory computer readable storage medium of claim 16, wherein the computer usable program code configured to request provisioning of the set of endpoint storage devices from the storage area network comprises the computer usable program code configured to communicate a port number of the adapter and an identifier of the adapter.

18. The apparatus of claim 13, wherein the computer readable program code configured to supply the data from the entry of the second device data structure that corresponds to the adapter to the execution space of the first virtual operating system instance comprises the computer readable program code configured to pass the data as a parameter in a method invocation.

19. The apparatus of claim 13, wherein the computer readable program code is further configured to maintain the device data structure separately from the operating system instance maintaining the second device data structure, wherein user space of the operating system instance lacks visibility of the device data structure and user space of the first virtual operating system instance lacks visibility of the second device data structure.

* * * * *